(12) United States Patent
Steiger

(10) Patent No.: US 7,250,202 B1
(45) Date of Patent: *Jul. 31, 2007

(54) RECORDING SHEETS FOR INK JET PRINTING

(76) Inventor: Rolf Steiger, Route de la Côte 12, CH-1724, Praroman (CH)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

This patent is subject to a terminal disclaimer.

(21) Appl. No.: 09/336,462

(22) Filed: Jun. 18, 1999

(30) Foreign Application Priority Data

Jun. 18, 1998 (EP) ................... 98810556

(51) Int. Cl.
*B41M 5/50* (2006.01)

(52) U.S. Cl. ............... 428/32.26; 428/32.3; 428/32.34

(58) Field of Classification Search ............... 428/195, 428/323, 500, 32.15, 32.22, 32.34
See application file for complete search history.

(56) References Cited

U.S. PATENT DOCUMENTS

| | | | |
|---|---|---|---|
| 2,271,623 A | 2/1942 | Carroll | 95/7 |
| 2,288,226 A | 6/1942 | Carroll et al. | 95/7 |
| 2,739,891 A | 3/1956 | Knox, Jr. et al. | 117/34 |
| 2,823,123 A | 2/1958 | Knox, Jr. et al. | 96/94 |
| 2,831,766 A | 4/1958 | Knox, Jr. et al. | 96/94 |
| 2,944,900 A | 7/1960 | Carroll et al. | 96/100 |
| 3,068,101 A | 12/1962 | Knox, Jr. et al. | 96/94 |
| 3,133,816 A | 5/1964 | Ben-Ezra | 96/94 |
| 3,158,484 A | 11/1964 | Willems et al. | 96/107 |
| 3,210,191 A | 10/1965 | Willems et al. | 96/107 |
| 3,253,919 A | 5/1966 | Beavers et al. | 96/50 |
| 3,294,540 A | 12/1966 | Goffe | 96/87 |
| 3,415,649 A | 12/1968 | Nishio et al. | 96/94 |
| 3,441,413 A | 4/1969 | Nishio et al. | 96/94 |
| 3,475,174 A | 10/1969 | Sato et al. | 96/94 |
| 3,507,660 A | 4/1970 | Nishio et al. | 96/114.5 |
| 3,545,974 A | 12/1970 | Nishio et al. | 96/114.5 |
| 3,589,906 A | 6/1971 | McDowell | 96/87 |
| 3,666,478 A | 5/1972 | Groh et al. | 96/114.5 |
| 3,671,247 A | 6/1972 | Yoneyama et al. | 96/66.3 |
| 3,726,683 A | 4/1973 | Yamamoto et al. | 96/84 |
| 3,754,924 A | 8/1973 | De Geest et al. | 96/114.2 |
| 3,756,828 A | 9/1973 | Yoneyama et al. | 96/87 |
| 3,772,021 A | 11/1973 | Yoneyama et al. | 96/66.3 |
| 3,843,368 A | 10/1974 | Yamamoto et al. | 96/67 |
| 4,775,594 A | 10/1988 | Desjarlais | 428/421 |
| 5,354,634 A | 10/1994 | Misuda et al. | 430/18 |
| 5,573,582 A * | 11/1996 | Inui et al. | 106/287.17 |
| 5,589,277 A | 12/1996 | Malhotra | 428/500 |
| 5,683,793 A | 11/1997 | Malhotra et al. | 428/216 |
| 5,942,335 A * | 8/1999 | Chen et al. | 428/500 |
| 6,051,106 A * | 4/2000 | Omura et al. | 162/135 |
| 6,153,305 A * | 11/2000 | Uemura et al. | 428/478.2 |
| 6,156,419 A * | 12/2000 | Brugger et al. | 428/204.4 |
| 6,156,606 A * | 12/2000 | Michaelis | 428/323 |
| 6,284,339 B1 * | 9/2001 | Floegel et al. | 428/43 |

FOREIGN PATENT DOCUMENTS

| | | |
|---|---|---|
| BE | 731126 | 9/1969 |
| EP | 0 298 424 | 1/1989 |
| EP | 0 407 720 | 1/1991 |
| EP | 0 410 051 | 1/1991 |
| EP | 0 500 021 | 8/1992 |
| EP | 0559 324 | 9/1993 |
| EP | 0 614 771 | 9/1994 |
| EP | 0 667 246 | 8/1995 |
| EP | 0 685 345 | 12/1995 |
| EP | 0 875 394 | 11/1998 |
| GB | 1102495 | 12/1965 |
| GB | 1022878 | 3/1966 |
| GB | 1138514 | 1/1969 |
| GB | 1159825 | 7/1969 |
| GB | 1179290 | 1/1970 |
| GB | 1198450 | 7/1970 |
| GB | 1374780 | 11/1974 |
| GB | 1397218 | 6/1975 |
| JP | 217603 | 8/1998 |
| WO | WO95/28285 | 10/1995 |

* cited by examiner

*Primary Examiner*—Pamela R. Schwartz
(74) *Attorney, Agent, or Firm*—Onofrio Law; Dara L. Onofrio, Esq.

(57) ABSTRACT

A recording sheet for ink jet printing comprising a support onto which is coated at least one ink receiving layer and includes a porous inorganic oxide and an aliphatic hydroxycarboxylic acid with at least 2 C atoms.

15 Claims, No Drawings

RECORDING SHEETS FOR INK JET PRINTING

FIELD OF THE INVENTION

This invention relates to recording sheets suitable for use in an ink jet printing process and to coating compositions for the preparation of ink receiving layers for this process. It relates especially to recording sheets where the image recorded thereon can be observed by both reflected or transmitted light, where the ink receiving system consists of a support onto which is coated at least one ink receiving layer, said recording sheet being characterised in that at least one coated layer contains a porous inorganic oxide and an aliphatic hydroxycarboxylic acid with more than 2 C atoms.

BACKGROUND OF THE INVENTION

Recording sheets for the ink jet printing process available today do not have all the required properties. Particularly there is an urgent need to improve ink absorptiveness, ink absorption rate, image quality, water fastness and light stability. A preferred embodiment of the invention relates to improved recording sheets having excellent image quality, high ink absorptiveness and high ink absorption rate. In particular ink receiving materials are needed where the images recorded thereon are resistant to rubbing on the surface and remain intact when in contact with water and should not fade when exposed to light.

Ink jet printing processes are of two types: continuous stream and drop-on-demand.

In continuous stream ink jet printing systems, ink is emitted in a continuous stream under pressure through a nozzle. The stream is perturbed, causing it to break up into individual droplets at a fixed distance from the nozzle. At the break-up point, the droplets are charged in accordance with digital data signals and passed through an electric field which adjusts the trajectory of each droplet in order to direct it to a gutter for recirculation or a specific location on a recording medium.

In the non-continuous process, or the so called "drop-on-demand" systems, a droplet is expelled from a nozzle to a position on a recording medium in accordance with digital data signals. A droplet is not formed or expelled unless it is to be placed on the recording medium.

The invention is directed towards recording sheets and coating compositions that may be used in both recording processes.

It is known that recording sheets for ink jet printing must meet a number of stringent demands. The printed image has to have the following properties:
  High resolution
  High colour density
  Good colour reproduction
  High resistance to rubbing
  Good water fastness
  High light stability The following conditions have to be met to attain these goals:
1. The ink needs to be absorbed quickly into the recording sheet.
2. The jetted ink droplets have to spread circularly on the recording sheet and have to form well defined edges.
3. Dye diffusion in the recording sheet has to be low so that the diameter of the colour points is not increased more than necessary.
4. An ink droplet is not allowed to interfere with a droplet deposited earlier nor should it blur it.
5. The recording sheet needs to have a surface that gives high colour density and brilliance.
6. The recording sheet has to show excellent physical properties before and after printing.
7. The printed recording sheet is not allowed to show changes under the influence of light.

Recording sheets, which contain in at least one layer a porous inorganic oxide, show a particularly high ink absorption rate and good dye fixing. Pseudo-bohemite, an agglomerate of aluminium oxide/hydroxide of formula $Al_2O_3 \cdot n H_2O$ (n=1 to 1.5) is particularly preferred as the inorganic porous oxide. Recording sheets of this kind are described, for example, in patent applications EP 0,298,424, EP 0,407,720 and EP 0,500,021. However, these materials show a great disadvantage in that the dyes used in the ink jet printing process have bad light stability.

In order to prevent such materials containing such porous oxides from turning yellow, patent application EP 0,614,771 proposes to add organic acids with a first dissociation coefficient of at most 5 wherein these acids contain an aromatic ring or at least two carboxy groups. Particularly preferred are acids with a first dissociation coefficient between 2 and 5.

U.S. Pat. No. 4,775,594 describes the addition of non-volatile organic acids to transparent recording sheets for ink jet printing to improve the wettability of such a material by the inks.

Patent application EP 0,410,051 describes a paper with improved printability (adhesion of printing dyes) containing cinnamic acid or cinnamic acid derivatives in a surface layer.

Patent application EP 0,585,345 proposes the addition of dithiocarbamates, thiurams, thiocyanates or sterically hindered amines to recording sheets comprising porous inorganic oxides to improve light stability.

All these proposed methods, however, only give a marginal improvement of light stability of images printed on receiving sheets comprising porous inorganic oxides in an ink jet printing process.

Accordingly an object of the present invention is to provide recording sheets for use in ink jet recording which have high ink absorptiveness, high ink absorption rate, excellent image quality, excellent water fastness and an excellent light stability.

A further objective is to provide recording materials giving excellent image quality with the wide variety of ink jet printers available on the market today.

SUMMARY OF THE INVENTION

The invention proposes to achieve these objectives by providing a recording sheet for ink jet printing comprising a support wherein at least one layer is coated thereon and contains a porous inorganic oxide and an aliphatic hydroxycarboxylic acid with more than 2 C atoms. The porous inorganic acid and the aliphatic hydroxycarboxylic acid may be contained in the same layer or in different layers.

Colloidal silicium dioxide, colloidal aluminium oxide or colloidal aluminium oxide/hydroxide may be used as porous inorganic oxide. Colloidal aluminium oxide or colloidal aluminium oxide/hydroxide are preferred. Especially preferred as colloidal aluminium oxide is $\gamma$-$Al_2O_3$ or a colloidal aluminium oxide/hydroxide modified with salts of the rare earth metal series as described in patent application EP 0,875,394. A specially preferred aluminium oxide/hydroxide is pseudo-bohemite, an agglomerate of aluminium oxide/ hydroxide of formula $Al_2O_3 \cdot n\, H_2O$, where n is from 1 to 1.5, or pseudo-bohemite modified with the salts of the rare earth metal series as also described in patent application EP 0,875,394.

The aliphatic hydroxycarboxylic acid with more than 2 C atoms may be incorporated in different ways into the receiving sheets.

One possibility is the direct addition to the coating solutions that are coated subsequently onto the support.

In another embodiment of the invention the porous inorganic oxide may be reacted in aqueous solution in a separate step, for example by heating under reflux, with the aliphatic hydroxycarboxylic acid before it is added to the coating solution. Especially preferred is the method where an aluminium alkoxide is hydrolysed to pseudo-bohemite in the presence of the aliphatic hydroxycarboxylic acid with more than 2 C atoms in a similar process as described in U.S. Pat. No. 5,354,634.

Preferred aliphatic hydroxycarboxylic acids are water soluble monohydroxymonocarboxylic acids.

2-Hydroxypropionic acid is especially preferred as water soluble monohydroxymonocarboxylic acid.

The invention is explained in detail in the following description.

DETAILED DESCRIPTION OF THE INVENTION

The invention describes a recording sheet for ink jet printing comprising a support having one or more layers comprising a porous inorganic oxide and an aliphatic hydroxycarboxylic acid with more than 2 C atoms. The porous inorganic acid and the aliphatic hydroxycarboxylic acid may be contained in the same layer or in different layers.

Colloidal silicium dioxide, colloidal aluminium oxide or colloidal aluminium oxide/hydroxide may be used as porous inorganic oxide. Colloidal aluminium oxide or colloidal aluminium oxide/hydroxide are preferred. Especially preferred as colloidal aluminium oxide is $\gamma$-$Al_2O_3$ and as colloidal AlOOH an AlOOH modified with salts of the rare earth metal series as described in patent application EP 0,875,394. This porous aluminium oxide/hydroxide contains one or more elements of the rare earth metal series of the periodic system of the elements with atomic numbers 57 to 71, preferably in a quantity from 0.4 to 2.5 mole percent relative to $Al_2O_3$. Especially preferred as aluminium oxide/hydroxide is pseudo-bohemite, an agglomerate of aluminium oxide/hydroxide of formula $Al_2O_3 \cdot n\, H_2O$ where n is from 1 to 1.5, or pseudo-bohemite modified with the salts of the rare earth metal series as also described in patent application EP 0,875,394. This porous pseudo-bohemite contains one or more elements of the rare earth metal series of the periodic system of the elements with atomic numbers 57 to 71, preferably in a quantity from 0.4 to 2.5 mole percent relative to $Al_2O_3$.

The aliphatic hydroxycarboxylic acid with more than 2 C atoms may be incorporated by different methods into the receiving sheets.

One possibility is direct addition to the coating solutions that are coated subsequently onto the support. In this embodiment the value of pH of the coating solutions is adjusted by the addition of the aliphatic hydroxycarboxylic acid with more than 2 C atoms to a value from 2.5 to 5.5, preferably to a value from 3.0 to 5.0.

In another embodiment of the invention the porous inorganic oxide may be reacted in aqueous solution in a separate step by heating under reflux with the aliphatic hydroxycarboxylic acid with more than 2 C atoms before it is added to the coating solution. In this embodiment the value of pH of the aqueous solution is adjusted by the addition of the aliphatic hydroxycarboxylic acid with more than 2 C atoms to a value from 2.5 to 4.0, preferably to a value from 2.5 to 3.5.

Especially preferred is the method wherein an aluminium alkoxide is hydrolysed in the presence of the organic hydroxycarboxylic acid with more than 2 C atoms in a similar process as described in U.S. Pat. No. 5,354,634. This hydrolysis is carried out preferentially in a range of pH from 2.5 to 6.0; especially preferred is the range of pH from 3.0 to 5.0. The value of pH is adjusted to the desired value by addition of the aliphatic hydroxycarboxylic acid.

Preferred aliphatic hydroxycarboxylic acids with more than 2 C atoms are water soluble monohydroxymonocarboxylic acids.

2-Hydroxypropionic acid is especially preferred as water soluble monohydroxymonocarboxylic acid with more than 2 C atoms.

According to the invention, the ink receiving sheets contain in the coated layers, in addition to the porous inorganic oxide and the water soluble aliphatic hydroxycarboxylic acid, one or more binders.

These binders normally are water soluble polymers. Especially preferred are film forming polymers.

These water soluble polymers may include for example natural polymers or modified products thereof such as albumin, gelatine, casein, starch, gum arabicum, sodium or potassium alginate, hydroxyethylcellulose, carboxymethylcellulose, $\alpha$-, $\beta$- or $\gamma$-cyclodextrine and the like. In the case where one of the water soluble polymers is gelatine, all known types of gelatine may be used as for example acid pigskin or limed bone gelatine, acid or base hydrolysed gelatine, but also derivatised gelatines like for instance phthaloylated, acetylated or carbamoylated gelatine or gelatine derivatised with the anhydride of trimellytic acid.

A preferred natural binder is gelatine.

Synthetic polymers are also used and include for example polyvinyl alcohol; polyvinyl pyrrolidone, completely or partially saponified products of copolymers of vinyl acetate and other monomers; homopolymers of or copolymers with monomers of unsaturated carboxylic acids such as (meth) acrylic acid, maleic acid, crotonic acid and the like; homopolymers of or copolymers with vinyl monomers of sulfonated vinyl monomers such as vinylsulfonic acid, styrene sulfonic acid and the like. Furthermore homopolymers of or copolymers with vinyl monomers of (meth)acrylamide; homopolymers or copolymers of other monomers with ethylene oxide; polyurethanes; polyacrylamides; water soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolysed polyvinyl acetates; polyamides; polyvinyl pyridines; polyacrylic acid; copolymers with maleic anhydride; polyalkylene oxides; methacrylamide copolymers and maleic acid copolymers can be used. All these polymers can also be used as mixtures.

Preferred synthetic binders are polyvinyl alcohol and polyvinyl pyrrolidone or their mixtures.

These polymers can be blended with non water soluble natural or synthetic high molecular compounds, particularly with acrylate latices or with styrene acrylate latices.

Although not specifically claimed in this invention non water soluble polymers are nevertheless considered part of the system.

The polymers mentioned above having groups with the possibility to react with a crosslinking agent can be crosslinked or hardened to form essentially non water soluble layers. Such crosslinking bonds may be either covalent or ionic. Crosslinking or hardening of the layers allows for the modification of the physical properties of the layers, like for instance in water absorbtiveness of the layer or in resistance against physical damage.

The crosslinking agents or hardeners are selected depending on the water soluble polymers used.

Organic crosslinking agents and hardeners include for example aldehydes (such as formaldehyde, glyoxal or glutaraldehyde), N-methylol compounds (such as dimethylol urea or methylol dimethylhydantoin), dioxane derivatives (such as 2,3-dihydroxy dioxane), reactive vinyl compounds (such as 1,3,5-trisacrylolyl hexahydro-s-triazine or bis-(vinylsulfonyl) methyl ether), active halogen compounds (such as 2,4-dichloro-6-hydroxy-s-triazine), epoxydes, aziridines, carbamoyl pyridinium compounds or mixtures of two or more of the above mentioned crosslinking agents.

Inorganic crosslinking agents or hardeners include for example chromium alum, aluminium alum or boric acid.

The layers may also contain reactive compounds that crosslink the layers under the influence of UV light, electron beams, X-ray beams or heat.

The layers can be further modified by the addition of fillers. Possible fillers used for example are kaolin, talcum, Ca- or Ba-carbonates, silica, titanium dioxide, bentonite, zeolite, aluminium silicate, calcium silicate or colloidal silicium dioxide. Likewise it is also possible to use organic inert particles such as polymer beads. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. Alternatively they are of interest in cases where the printed images are be to used as remission pictures. Often the introduction of such filler causes a wanted matte surface.

The recording sheets may further contain water soluble metal salts, as for example salts of the alkaline earth's or salts of the rare earth metal series.

The image recording sheets of the invention comprise a support with at least one ink receiving layer coated thereon. A wide variety of such supports are known and commonly employed in the art. They include all those supports used in the manufacture of photographic materials. This includes clear films made from cellulose esters such as cellulose triacetate, cellulose acetate, cellulose propionate or cellulose acetate butyrate, polyesters such as poly(ethylene terephthalate), polyamides, polycarbonates, polyimides, polyolefins, poly(vinyl acetals), polyethers, polyvinyl chloride and polysulfonamides. Polyester film supports, and especially poly(ethylene terephthalate) are preferred because of their excellent dimensional stability characteristics. The usual supports used in the manufacture of opaque photographic material can be used including for example baryta paper, polyethylene coated papers, voided polyester as for instance MELINEX® manufactured by ICI. Especially preferred are resin coated paper or voided polyester.

When such a support material, in particular polyester, is used, a subbing layer is advantageously added first to improve the bonding of the ink receiving layers to the support. Useful subbing compositions for this purpose are well known in the photographic art and include for example terpolymers of vinylidene chloride, acrylonitrile and acrylic acid or of vinylidene chloride, methyl acrylate and itaconic acid.

Also used as supports are plain paper, comprising all different types of papers varying widely in their composition and in their properties. Pigmented papers and cast coated papers can be used as well as metal foils, such as foils made from alumina.

The ink receiving layers according to this invention are in general coated from aqueous solutions or dispersions containing all necessary ingredients. In many cases surfactants are added to those coating solutions or dispersions to allow for smooth coating and evenness of the layers. Suitable surfactants are described in many patents, for example, U.S. Pat. Nos. 2,240,472, 2,271,623, 2,288,226, 2,739,891, 2,823,123, 2,831,766, 2,944,900, 3,068,101, 3,133,816, 3,158,484, 3,210,191, 3,253,919, 3,294,540, 3,415,649, 3,441,413, 3,475,174, 3,507,660, 3,545,974, 3,589,906, 3,666,478, 3,671,247, 3,726,683, 3,754,924, 3,756,828, 3,772,021 and 3,843,368; GB patents 1,012,495, 1,022,878, 1,138,514, 1,159,825, 1,179,290, 1,198,450, 1,374,780 and 1,397,218, and BE patent 731,126.

Besides being necessary for coating purposes these compounds may have an influence on the image quality and may therefore be selected with this specific goal in mind. Although not specifically claimed in this invention surfactants nevertheless form an important part of the invention.

In addition to the above mentioned elements recording sheets as claimed in this invention may contain additional additives aimed at further improving its performance, as for example brightening agents to improve the whiteness, such as stilbenes, coumarines, triazines, oxazoles or others compounds known to someone skilled in the art.

Light stability can be improved by adding UV absorbers such as benzotriazoles, benzophenones, thiazolidones, oxazoles, thiazoles and other compounds known to someone skilled in the art. The amount of UV absorber can vary from 200–2000 mg/m$^2$, preferably from 400–1000 mg/m$^2$. The UV absorbers may be added to any of the layers of the recording sheets of the invention. It is preferred however if they are added, that the UV absorbers are included in the topmost layer of the system.

It is further known that images produced by ink jetting can be protected from degradation by the addition of light stabilisers and antioxidants. Examples of such compounds are sterically hindered phenols, sterically hindered amines, chromanols and the like. The above mentioned additives can be added as aqueous solutions to the coating solutions. In the case where these compounds are not water soluble they can be incorporated into the coating solutions by other common techniques known in the art. The compounds may be for example dissolved in a water miscible solvent such as lower alcohols, glycols, ketones, esters or amides. Alternatively the compounds can be added to the coating solutions as fine dispersions, as oil emulsions, as cyclodextrine inclusion complexes or incorporated into latex particles.

Typically the receiving layers according to this invention have a thickness in the range of 0.5 to 100 µm dry thickness, preferably in the range of 5 to 50 µm.

The coating solutions or coating dispersions can be coated onto a support by any number of suitable procedures. Usual coating methods include extrusion coating, air knife coating, doctor blade coating, cascade coating or curtain coating. The coating solutions may also be applied using spray techniques. The ink receiving layers can be built up from several single layers that can be coated one after the other or simultaneously. It is likewise possible to coat a support on both sides with ink receiving layers. It is also possible to coat an antistatic layer or an anticurl layer on the backside. The method however by which the claimed ink receiving layers are produced is not to be considered limiting for the present invention.

Inks for ink jet printing consist in essence of a liquid vehicle and a dye or pigment dissolved or suspended therein. The liquid vehicle for inks employed for ink jet printing consists in general of water or a mixture of water and a water miscible organic solvent such as ethylene glycol, higher molecular weight glycols, glycerol, dipropylene glycol, polyethylene glycol, amides, polyvinyl pyrrolidone, N-methylpyrrolidone, cyclohexyl pyrrolidone, carboxylic acids and their esters, ethers, alcohols, organic sulfoxides, sulfolane, dimethylformamide, dimethylsulfoxide, cellosolve, polyurethanes, acrylates and the like.

The non water parts of the ink generally serve as humefactants, cosolvents, viscosity regulating agents, ink penetration additives or drying agents. The organic components have in most cases a boiling point which is higher than that of water. In addition aqueous inks used for printers of the continuous flow type may contain inorganic or organic salts to increase electric conductivity. Examples of such salts include nitrates, chlorides, phosphates and salts of water soluble organic acids like acetates, oxalates and citrates. The dyes and pigments suitable for the preparation of inks useable with the recording sheets of the invention cover practically all classes of known colouring compounds. Dyes or pigments typically used for this purpose are described in patent application EP 0,559,324. The recording sheets according to this invention are meant to be used in conjunction with most of the inks representing the state of the art.

Other additives present in inks are for instance surfactants, optical brighteners, UV absorbers, light stabilisers, biocides and polymeric additives.

This description of the inks is for illustration only and is not to be considered as limiting for the purpose of the invention.

Coatings of the recording sheets according to the invention were prepared in the following way:

100 g/m$^2$ of the coating solutions, which preparation is described later on, were coated at a temperature of 40° C. onto a transparent polyester support. The coated support was then dried for 60 minutes at a temperature of 30° C. All coatings contain 10 g/m$^2$ of colloidal aluminium oxide or colloidal aluminium oxide/hydroxide (calculated as $Al_2O_3$).

The following test procedure was used to evaluate the light stability of the recording sheets described in the present invention.

Colour patches in the 4 colours cyan, magenta, yellow and black were printed onto transparent recording sheets according to the invention, as described later on in the examples, with an ink jet printer EPSON STYLUS™ COLOR 500 in transparent mode using original inks.

The printed samples were irradiated in an ATLAS Ci35A Weather-O-Meter® with a 6500 W Xenon lamp until a total illumination of 40 kJoule/cm$^2$ was reached. The density loss was measured with an X-Rite® densitometer. It is expressed as percent loss of initial density. In one colour black density losses are given in this order for the three colour channels yellow, magenta and cyan.

EXAMPLES

Example 1 a) Hydrolysis of Aluminium Isopropoxide

A mixture of 360 g of deionised water and 338 g of isopropanol was prepared in a glass vessel. 153 g of aluminium isopropoxide (available from Fluka Chemie AG, Buchs, Switzerland) were added to this mixture at a temperature of 75° C. and the resulting mixture was stirred for 4 hours at a temperature between 75° C. and 78° C. Afterwards the temperature was increased to 95° C. and 1.5 g of 2-hydroxypropionic acid were added. The temperature was then reduced to between 75° C. and 78° C. and the mixture was kept with stirring for 48 hours at this temperature. Finally the resulting colloidal solution was evaporated under vacuum. 43 g of a white solid with 75.2% of $Al_2O_3$ were obtained. The X-ray diffraction spectrum was equivalent to the one of pseudo-bohemite of formula AlOOH.

b) Preparation of the Coating Solution 13.3 g of the dried solid from example 1a) were added under stirring at a temperature of 40° C. to a mixture of 50 g of deionised water and 7.0 g of acetic acid (17.65%). Afterwards 16 g of a solution of polyvinyl alcohol (7.5% by weight, hydrolysis degree 98–99%, molecular weight 85,000 to 146,000) (36,315-4, available from ALDRICH Chemie, Buchs, Switzerland) were added. The resulting solution was exposed for 3 minutes to ultrasound. The value of pH was adjusted 3.3 with acetic acid and the total weight was adjusted to 100 g with deionised water.

Comparative Example A a) Hydrolysis of Aluminium Isopropoxide 1 g of nitric acid (30%) was used for the hydrolysis instead of 1.5 g of 2-hydroxypropionic acid of example 1. 44.6 g of a white solid with 77.2% of $Al_2O_3$ was obtained. The X-ray diffraction spectrum was equivalent to the one of pseudo-bohemite of formula AlOOH.

b) Preparation of the Coating Solution

In place of the 13.3 g of the dried solid and 7.0 g of acetic acid (17.65%) of example 1a) 12.953 g of the dried solid of example Aa) and 6.8 g of acetic acid (17.65%) were used. The value of pH of the solution was 3.3.

Comparative Examples B–K a) Hydrolysis of Aluminium Isopropoxide

The hydrolysis was performed as in comparative example A.

b) Preparation of the Coating Solutions

In place of the acetic acid (17.65%) of comparative example A the acids listed in Table 1 were used. The value of pH was adjusted to 3.3 with the corresponding acid.

TABLE 1

| Comparative example no. | Acid |
| --- | --- |
| B | Propionic acid |
| C | Malonic acid |
| D | Succinic acid |
| E | Adipic acid |
| F | Maleic acid |
| G | Oxalic acid |
| H | L(+)-Tartric acid |
| I | Phthalic acid |
| J | Glycolic acid |
| K | Hydroxymalonic acid |

Example 2 a) Hydrolysis of Aluminium Isopropoxide

The hydrolysis was performed as in comparative example A.

b) Preparation of the Coating Solution

In place of the 6.8 g of acetic acid (17.65%) of example Ab) 2.9 g of 2-hydroxypropionic acid were used. The value of pH of the solution was 3.3.

Example 3 a) Hydrolysis of Aluminium Isopropoxide

The hydrolysis was performed as in comparative example A.

b) Preparation of the Coating Solution

After addition of the 2-hydroxypropionic acid as in example 2 the resulting solution was heated under reflux during 20 hours before the addition of the polyvinyl alcohol.

Example 4

Preparation of the Coating Solution 18 g of γ-$Al_2O_3$ (ALU C, available from DEGUSSA AG, Baar, Switzerland) (content 96.2% $Al_2O_3$) were dispersed at room temperature under stirring in 63 g of deionised water. The value of pH was adjusted to 3.3 with 2-hydroxypropionic acid. Afterwards the solution was heated under reflux for 20 hours. Then 16 g of a solution of polyvinyl alcohol (7.5% by weight, hydrolysis degree 98–99%, molecular weight 85,000 to 146,000) (36,315-4, available from ALDRICH Chemie, Buchs, Switzerland) were added, the resulting solution was exposed for 2 minutes to ultrasound, the value of pH was adjusted again to 3.3 with 2-hydroxypropionic acid and the total weight was adjusted to 100 g with deionised water.

Comparative Example L

Preparation of the Coating Solution

In place of the 2-hydroxypropionic acid of example 4 acetic acid was used.

Example 5

Preparation of the Coating Solution 18 g of the white solid of example 1a) were dispersed under stirring at a temperature of 20° C. in 80 g of deionised water. Afterwards 0.212 g of $LaNO_3$ (available from Fluka Chemie AG, Buchs, Switzerland) were added at a temperature of 90° C. and the solution was stirred for a further 2 hours. The solution was evaporated under vacuum. A white solid was obtained containing 0.222 mole % of lanthanum.

13.83 g of this powder was added under stirring at a temperature of 40° C. to a mixture of 57 g of deionised water and 6.81 g of acetic acid (17.65%). Afterwards 16 g of a solution of polyvinyl alcohol (7.5% by weight, hydrolysis degree 98–99%, molecular weight 85,000 to 146,000) (36,315-4, available from ALDRICH Chemie, Buchs, Switzerland) were added, the resulting solution was exposed for 3 minutes to ultrasound, the value of pH was again adjusted to 3.3 with acetic acid and the total weight was adjusted to 100 g with deionised water.

Comparative Example M

Preparation of the Coating Solution

In place of 5 g of the white powder of example 1a) 5.1 g of the white powder of comparative example A were used.

The results of the light stability tests are listed in Table 2 for the case where pseudo-bohemite was used as the inorganic porous oxide.

TABLE 2

| Example no. | Density Loss in percent | | | | | |
|---|---|---|---|---|---|---|
| | Yellow | Magenta | Cyan | | Black | |
| 1 | 18 | 23 | 16 | 31 | 35 | 45 |
| 2 | 15 | 30 | 10 | 33 | 42 | 50 |
| 3 | 21 | 33 | 11 | 31 | 39 | 49 |
| A | 20 | 42 | 20 | 44 | 58 | 68 |
| B | 20 | 44 | 20 | 44 | 54 | 64 |
| C | 26 | 40 | 20 | 41 | 49 | 60 |
| D | 30 | 46 | 19 | 50 | 61 | 69 |
| E | 24 | 40 | 25 | 51 | 60 | 71 |
| F | 25 | 38 | 23 | 50 | 59 | 68 |
| G | 25 | 36 | 25 | 54 | 64 | 71 |
| H | 24 | 34 | 21 | 28 | 57 | 67 |
| I | 24 | 35 | 21 | 53 | 61 | 70 |
| J | 23 | 35 | 23 | 47 | 59 | 66 |
| K | 28 | 37 | 36 | 53 | 63 | 69 |

A comparison of the results of Table 2 shows that in the case where pseudo-bohemite was used as porous inorganic oxide the addition of 2-hydroxypropionic acid to the receiving sheets according to our invention (examples 1–3) significantly improves the light stability of all the 4 colours compared to receiving sheets containing acids that are state of the art (examples A–K). This improvement occurs independently of the method how the 2-hydroxypropionic acid is added to the receiving sheets.

The results of the light stability tests are listed in Table 3 for the case where γ-$Al_2O_3$ was used as the inorganic porous oxide.

TABLE 3

| Example no. | Density Loss in percent | | | | | |
|---|---|---|---|---|---|---|
| | Yellow | Magenta | Cyan | | Black | |
| 4 | 22 | 27 | 5 | 29 | 31 | 39 |
| L | 47 | 71 | 8 | 26 | 32 | 36 |

A comparison of the results of Table 3 shows that in the case where γ-$Al_2O_3$ was used as porous inorganic oxide the addition of 2-hydroxypropionic acid to the receiving sheets according to our invention (example 4) highly improves the light stability of the 3 colours yellow, magenta and cyan compared with a receiving sheet containing an acid that is state of the art (example L). This improvement occurs independently of the method how the 2-hydroxypropionic acid is added to the receiving sheets.

The results of the light stability tests are listed in Table 4 for the case where pseudo-bohemite modified with lanthanum nitrate according to patent application EP 0,875,394 was used as the inorganic porous oxide.

TABLE 4

| Example no. | Density Loss in % | | | | | |
|---|---|---|---|---|---|---|
| | Yellow | Magenta | Cyan | | Black | |
| 5 | 22 | 39 | 7 | 17 | 14 | 21 |
| M | 27 | 81 | 31 | 25 | 16 | 29 |

A comparison of the results of Table 4 shows that in the case where pseudo-bohemite modified with lanthanum nitrate was used as porous inorganic oxide the addition of 2-hydroxypropionic acid to the receiving sheets according to our invention (example 4) highly improves the light stability of all 4 colours compared to a receiving sheet containing an acid that is state of the art (example M).

Other trials where the value of pH of the coating solution was varied gave very similar same results as in the examples and comparative examples mentioned above.

The invention claimed is:

1. A recording sheet for ink jet printing comprising a support wherein at least one ink receiving layer is coated thereon and contains binders, a porous inorganic oxide and a water soluble monohydroxycarboxylic acid; wherein said porous inorganic oxide is colloidal aluminum oxide, colloidal aluminum oxide/hydroxide or pseudo-bohemite and wherein said porous inorganic oxide further includes at least one element of the rare earth metal series of the periodic system of the elements with atomic numbers 57 to 71.

2. A recording sheet according to claim 1 wherein said water soluble monohydroxymonocarboxylic acid is 2-hydroxypropionic acid.

3. A recording sheet according to claim 1 wherein said porous inorganic oxide is colloidal γ-Al2O3.

4. A recording sheet according to claim 1 wherein said pseudo-bohemite is prepared by hydrolysis of aluminum isopropoxide in the presence of the hydroxycarboxylic acid.

5. A recording sheet according to claim 1 to wherein said binders are gelatine, polyvinyl alcohol or polyvinyl pyrrolidone or mixtures thereof.

6. A recording sheet according to claim 1 wherein said element is present in an amount of from 0.04 to 4.2 mole percent relative to Al2O3.

7. A recording sheet according to claim 1 further comprising water soluble metal salts selected from the group consisting of alkaline earth metal salts and rare earth metal salts.

8. A recording sheet according to claim 7 wherein said rare earth metal salt is lanthanum nitrate.

9. A recording sheet according to claim 1 further comprising cross-linking agents.

10. A recording sheet according to claim 1 further comprising fillers selected from the group consisting of kaolin, talcum, Ca- or Ba-carbonates, silica, titanium dioxide; bentonite, zeolite, aluminum silicate, calcium silicate or colloidal silicium dioxide and polymer beads.

11. A recording sheet according to claim 1 further comprising at least one or more of a compound selected from the group consisting of surfactants, brightening agents, UV absorbers, light stabilizers and antioxidants.

12. A recording sheet according to claim 1 further comprising an auxiliary layer which includes a porous inorganic oxide and or a water soluble monohydroxycarboxylic acid.

13. A recording sheet according to claim 1 wherein the coating on said support has a thickness in the range of 0.5 to 100 μm dry thickness.

14. A recording sheet according to claim 1 wherein said support is coated with an antistatic layer or an anticurl layer on the uncoated support surface.

15. A recording sheet according to claim 1 further comprising fillers selected from the group consisting of inorganic inert particles.

* * * * *

UNITED STATES PATENT AND TRADEMARK OFFICE
CERTIFICATE OF CORRECTION

PATENT NO.        : 7,250,202 B1
APPLICATION NO.   : 09/336462
DATED             : July 31, 2007
INVENTOR(S)       : Steiger It is certified that error appears in the above-identified patent and that said Letters Patent is hereby corrected as shown below:

Title Page, Item (73) Assignee: insert,

(73) Assignee:ILFORD Imaging Switzerland GmbH (CH)

Signed and Sealed this

Thirtieth Day of September, 2008

JON W. DUDAS
*Director of the United States Patent and Trademark Office*